W. YEATTS.
ROTARY COMBUSTION ENGINE.
APPLICATION FILED MAY 10, 1920.
1,430,929.
Patented Oct. 3, 1922.
4 SHEETS—SHEET 1.
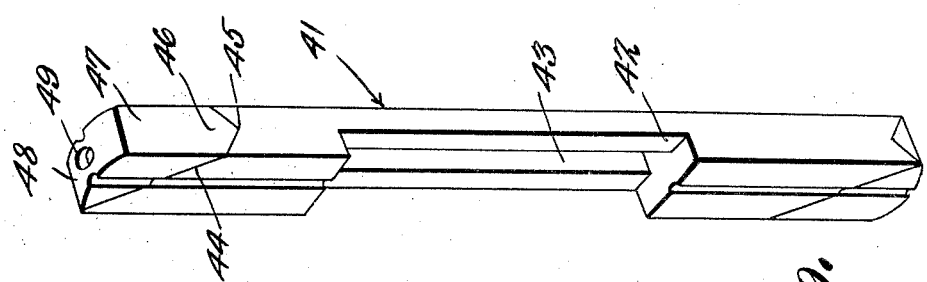
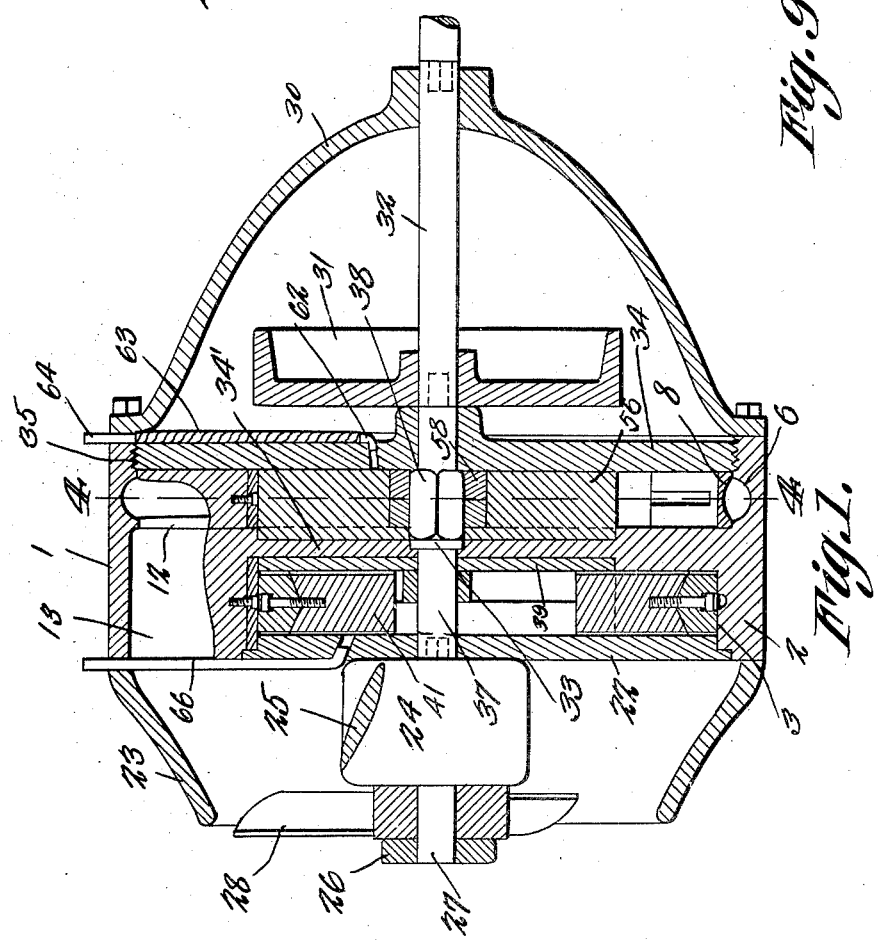
Inventor,
William Yeatts
Witness
By C. A. Snow & Co.
Attorneys.

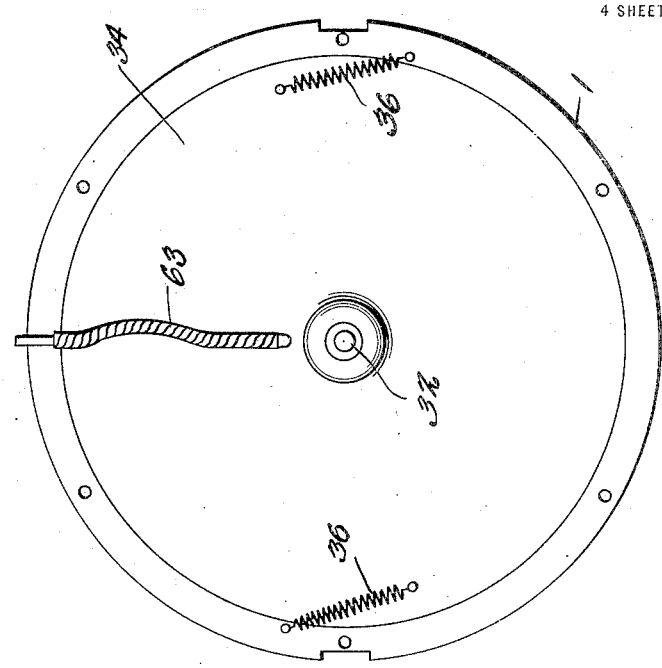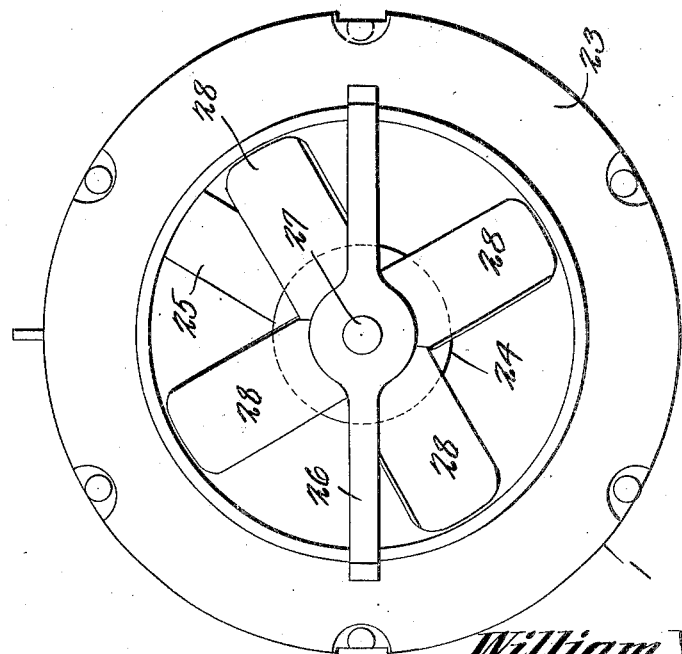

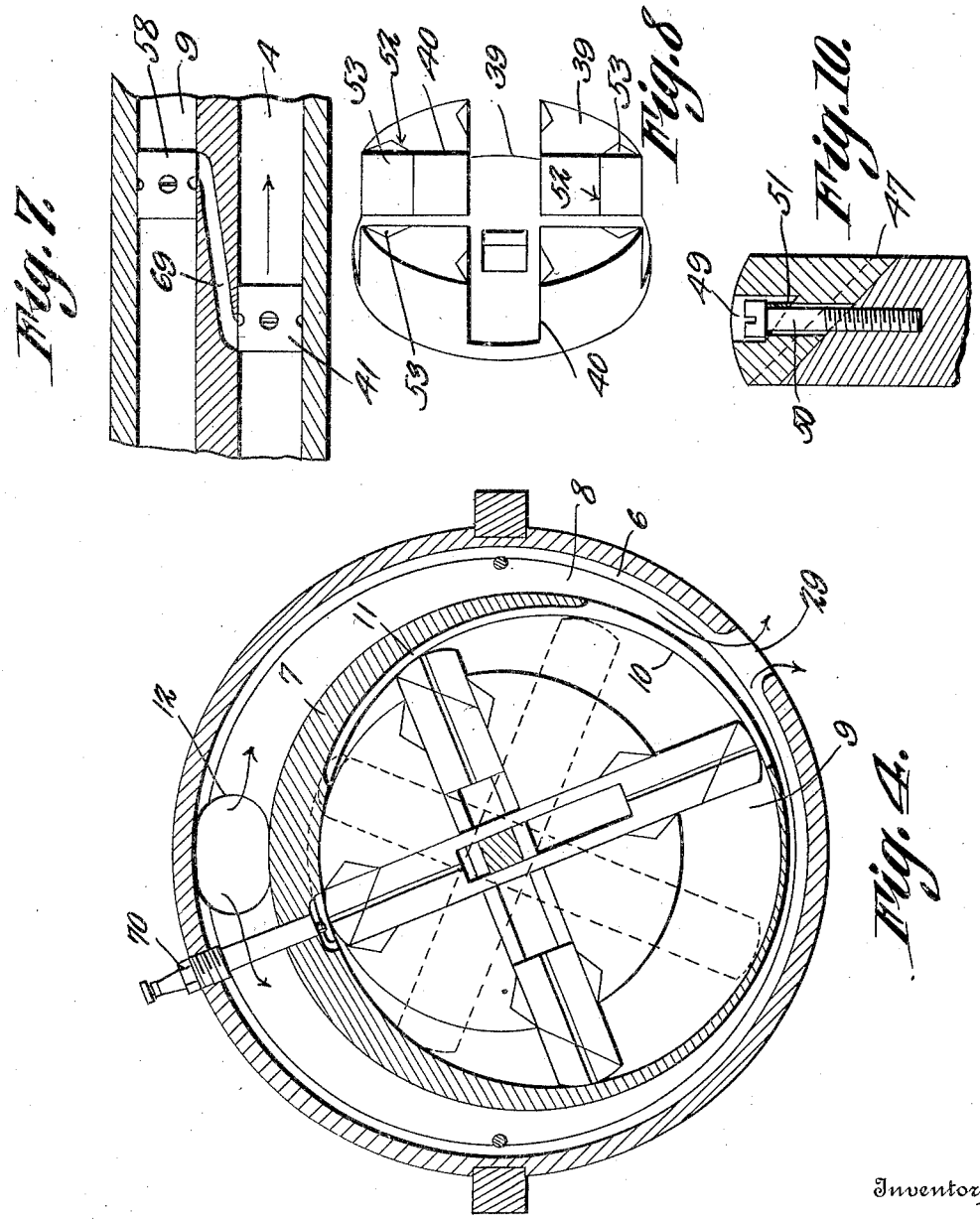

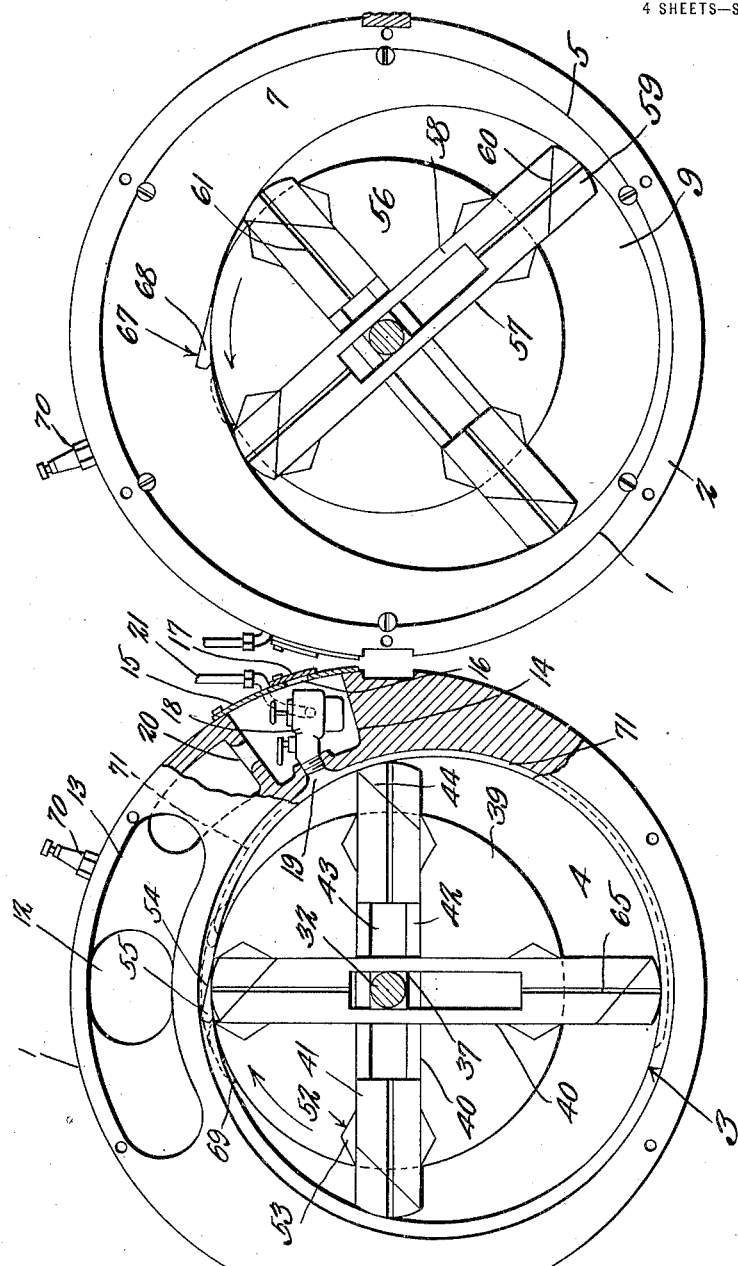

Patented Oct. 3, 1922.

1,430,929

UNITED STATES PATENT OFFICE.

WILLIAM YEATTS, OF JAVA, VIRGINIA, ASSIGNOR TO ROTARY MOTOR COMPANY, OF DANVILLE, VIRGINIA, INCORPORATED.

ROTARY COMBUSTION ENGINE.

Application filed May 10, 1920. Serial No. 380,318.

*To all whom it may concern:*

Be it known that I, WILLIAM YEATTS, a citizen of the United States, residing at Java, in the county of Pittsylvania and State of Virginia, have invented a new and useful Rotary Combustion Engine, of which the following is a specification.

This invention relates to rotary internal combustion engines, one of its objects being to provide, in connection with a stator, two rotors one of which operates to compress fuel and direct it into the explosion chamber while the other constitutes the piston for receiving the impact of the exploded fuel.

Another object is to provide means whereby the heads of the rotors cooperate successively to cut off communication between the compression compartment and the explosion chamber whereby communication between the two chambers is completely sealed during the explosion of the charge.

A further object is to provide heads upon the rotors which operate automatically to hug the wall of the chambers so as to prevent the escape of pressure past the heads.

Another object is to provide means whereby a circulation of air is set up within the wall of the explosion chamber for the purpose of cooling said wall and also to facilitate the exhaustion of burnt gases from said chamber.

A still further object is to mount the carburetor within the wall of the stator and in communication with the air passage in the wall of the stator, this carburetor being thus maintained at a high temperature so that vaporization of the fuel is facilitated.

A still further object is to provide improved means for lubricating the working parts of the engine.

With the foregoing and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings the preferred form of the invention has been shown.

In said drawings—

Figure 1 is a central longitudinal section through the motor.

Figure 2 is an elevation of one end thereof, the supporting structure being removed.

Figure 3 is an elevation of the other end of the motor, the supporting structure being removed.

Figure 4 is a section on line 4—4 Figure 1 and showing the rotor in elevation.

Figure 5 is an elevation of one end portion of the stator, a portion of its wall being broken away and the compressor being shown in elevation within the stator.

Figure 6 is an elevation of the other end of the stator and showing the explosion chamber and the rotor or piston therein, the head of the stator being removed.

Figure 7 is a horizontal section through a portion of the stator and showing the fuel passage connecting the two chambers in the stator and also showing the relative positions of the heads of the rotors immediately subsequent to the explosion of a charge.

Figure 8 is a perspective view of one of the rotors with the slides removed therefrom.

Figure 9 is a perspective view of one of the slides or pistons.

Figure 10 is a section through the head of one of the pistons or slides.

Referring to the figures by characters of reference 1 designates the casing or stator of the engine, the same comprising an outer shell 2 having an excentrically disposed cylindrical recess 3 extending thereinto from one end and forming a compression chamber 4 while extending into the other end of the stator is a concentric cylindrical recess 5 having an annular groove 6 therein. A ring 7 is secured within the recess 5 and has an annular groove 8 which matches the groove 6 so as to form a circular passage within the stator. A cylindrical opening is formed eccentrically within the ring 7 directly opposite to and of the same diameter of the compression chamber 4, this opening in the ring 7 forming an explosion chamber 9. The groove 8 in the periphery of the ring 7 has a slot 10 through which it communicates with the explosion chamber 9, as shown in Figure 4 and formed in the inner wall of the ring 7 is a groove 11 which extends to the slot 10 from a point near the uppermost portion of the ring 7. The groove 8 is of gradually increasing depth toward the top of the ring 7 and a port 12 opens into this groove from an air chamber 13 formed in the thickest portion of the wall of the compression chamber and opening to the external atmosphere as clearly illustrated in Figure 1. A pocket 14 is formed in the wall of the compression chamber and is adapted to be closed by a plate 15, there being an air inlet opening 16 in this plate adapted to be closed by a slot 17. A carburetor 18 is supported in the pocket and is adapted to deliver fuel through a port 19 into the compression chamber 4. A passage 20 serves as a means of communication between the pocket 14 and the air space 13 so that warmed air will thus be directed into the pocket 14 and will serve to facilitate the vaporizing of the fuel in the carburetor. The fuel pipe leading to the carburetor has been indicated at 21.

A head 22 closes the open end of the compression chamber 4, the same being bolted in place or fastened in any other manner desired. A tapered guard ring 23 is secured to one end of the stator and is concentric therewith, and arranged concentrically within this ring is a generator indicated generally at 24 and which is connected to the ring by one or more fins 25 obliquely disposed as shown in Figure 1. A cross strip 26 is arranged at the outer end of the ring and constitutes a bearing for one end of a shaft 27 extending through the generator and which shaft carries fan blades 28 working within the contracted end of the ring 23. Thus it will be seen that when the shaft is rotated these fan blades will force a current of cool air into the space 13, the blade or fin 25 being so pitched as to deflect the air current toward this air space. The air will then flow through the port 12 into the passage made up of the grooves 8 and 6 and will pass outwardly to the atmosphere through an exhaust port 29 formed in the stator opposite the slot 10 as shown in Figure 4. The outflow of air through this port 29 will also set up a suction through the slot 10 to insure the withdrawal of all the spent gases from the explosion chamber 9.

A hood 30 is secured to the other end of the stator and serves to house transmission mechanism a portion of which has been indicated at 31. The shaft 32 of the engine bears in this hood and also in the head 22 and has a central bearing 33 which engages that portion of the stator forming a partition 34' between the compression chamber and the explosion chamber. A head 34 is mounted on the shaft 32 and is provided, on its periphery, with screw threads 35 engaging corresponding threads within the wall of the stator. This head 34 is adapted to be screwed into the stator so as to press firmly against one side of the rotor as will be hereinafter set forth. One or more tangentially disposed springs 36 connect this head 34 to the stator and tend normally to hold the head screwed tightly against the rotor hereinafter described. It is to be understood, however, that when the frictional contact between the rotor and the head 34 becomes excessive due to expansion of metals, the springs 36 will yield and allow the head 34 to unscrew slightly so as to relieve this frictional engagement and allow for such expansion.

It will be noted that the shafts 27 and 32 are coupled together at their meeting ends and that portion of the shaft 32 extending across the compression chamber is angular in cross section as shown at 37 and that portion of the shaft extending across the combustion chamber 9 is angular in cross section as shown at 38. Mounted on the angular portion 37 is a cylindrical rotor 39 having intersecting diametrical grooves 40 extending into one face thereof and disposed at right angles to each other. The rotor 39 is concentric with the shaft 32 and is so proportioned that its periphery will touch the wall of the compression chamber 4 at a point directly under the port 12, thus leaving a crescent shaped space extending almost entirely around the rotor, as shown in Figure 5.

Slidably mounted in each of the grooves 40 is a piston 41 the middle portion of which is reduced in thickness, as at 42, and is provided with a longitudinal slot 43, through which the square portion 37 of the shaft extends. The ends of each piston project beyond the periphery of the rotor 39 and have their advancing faces beveled, as shown at 44, said faces being grooved longitudinally as indicated at 45 so as to receive a rib 46 formed upon the inner beveled end of a shifting block or head 47 which projects from the ends of the piston. The outer end of this block or head is rounded, as at 48, and has a slot 49 in which is mounted the head of a screw 50 which extends into the piston 41 so as to hold the head to the piston. It will be noted that the head of the screw bears upon a spacing washer 51 the inner face of which is parallel with the beveled end of the piston and is capable of a slight movement relative to the head 47. In other words this spacing washer 51 does not entirely fill the block 49 and, consequently, the head 47 can shift relative to the screw and along the beveled end of the piston thus to move the rounded end 48 of the head radially with respect to the rotor 39 and to the piston. As the advancing face of each piston is beveled, it will be obvious that the pressure of fuel being compressed in the path of the head 47 will tend to shift said head along the beveled face of the piston so as to press the head firmly against the wall of the compression chamber and thus prevent leakage of fuel between the piston head and the said wall.

Each groove 40 has angular recesses 52 in the walls thereof and in each of these recesses is seated a triangular wedging block 53 contacting with the adjacent surface of the piston 41. Thus it will be seen that as the piston reciprocates in its groove it will cause the blocks 53 to ride upon certain of the walls of the recesses 52 so as to bind upon the piston. These blocks 53 will operate in this manner when the piston is sliding in either direction. Thus leakage of fuel under pressure along the piston and toward the center of the rotor is prevented. A triangular recess 54 is formed in the wall of the compression chamber at the point of contact between the rotor and the stator and in this recess is mounted a wedge shaped block 55 capable of a slight longitudinal movement. The block is tapered in the direction of travel of the rotor, as will be seen by referring to Figure 5 and, consequently, the frictional engagement of the rotor with this block tends to shift said block along the inclined wall of the recess 54 so as to deflect the block inwardly against the rotor and prevent leakage.

The angular portion 38 of the shaft 32 is engaged by a cylindrical rotor 56 eccentrically disposed within the combustion chamber 9 and contacting with the wall of said chamber at a point in line with the point of contact between the rotor 39 and the wall of the compression chamber 4. Thus a crescent shaped space is formed between this rotor 56 and the wall of chamber 9 as shown in Figure 6.

The rotor 56 has crossed diametrical grooves 57 extending into one face thereof and disposed at right angles to each other. In each of these grooves is slidably mounted a piston 58 similar to the pistons 41, the pistons having their central reduced portions crossed and shiftable relative to each other and having heads 59 slidably mounted upon the beveled outer ends 60 of the pistons. These bevels are disposed oppositely to those of the pistons 41 so that, instead of the heads 59 being twisted against the wall of the explosion or combustion chamber 9 by the pressure of fuel in the path of the pistons, the said heads 59 will be shifted outwardly by the force exerted by the expanding exploding fuel back of the heads. These pistons 58 have sliding engagement with the screw threaded head 34 and are formed with longitudinal ducts 61 in those faces contacted by the head. These ducts open into the space formed by the parts in the piston and which space is supplied with lubricant through a nipple 62 opening through the head 34 and supplied by a flexible tube 63 from a pipe 64 carried by the stator 1. Similar lubricant ducts or grooves 65 are formed in those faces of the pistons 41 contacting with the head 22 and a tube 66 opens through the head 22 for supplying lubricant to the pistons. A recess 67 is formed in the wall of the combustion or explosion chamber 9 at the point of contact between the rotor 56 and the wall of said chamber and seated in this recess is a tapered block 68 the taper of which is extended oppositely to the direction of rotation of the rotor so that, when an explosion takes place in the chamber 9, the pressure of the expanding gas will be against the heel of the block so as to cause said block to be deflected toward the rotor and constitute a self-adjusting packing.

Extending from the compression chamber to the combustion or explosion chamber is a port 69 which opens through the periphery of each of said chambers so as to be closed successively by the pistons during the operation of the rotors. The port 69 is extended obliquely between the chambers and the ends of the port are so arranged that as one of the pistons 41 of the compresser passes off of one end of the port, one of the pistons 58 passes to position across the other end of the port. Thus it will be seen that as the pistons 41 rotate they will force air under pressure through the port 69 into the explosion chamber 9 and just as the piston 41 closes the port 69 the explosion takes place in the chamber 9 and one of the pistons 58 moves to position to close the port 69. Thus said port is doubly sealed during and immediately subsequent to the explosion and danger of backfiring in the chamber 4 is prevented. A spark plug 70 is suitably located for the purpose of igniting the charge, this spark plug being controlled by timing mechanism not shown.

In the operation of the engine herein described the rotation of the rotor 39 in the direction indicated by the arrow in Figure 5 will result in a charge of fuel being drawn into the chamber 4 from the port 19, there being grooves 71 extending from this port through approximately one-half the circumference of the chamber 4 so that as soon as one of the pistons leaves the point of contact between the rotor 39 and the wall of the chamber 4 said piston will begin to suck fuel from the port 19 through the grooves 71 and into the space back of the piston. This sucking of fuel will continue until the piston has made a one-half or approximately a one-half revolution whereupon it will be shut off from communication with the port 19 and the charge of fuel already supplied in front of said piston will begin to be compressed in the gradually reducing chamber 4 as the piston approaches the port 69. During the last quarter rotation of the piston the compressed fuel will be discharged into the port 69 and will flow into the space back of one of the pistons 58. During the completion of the first quarter rotation of the piston 58 the piston 41 which is expelling the charge into the port 69 will move to position to close said port and simultaneously with this action the charge in the chamber 4 will be exploded and one of the pistons 58 will come to position across the port 69 so as to further seal it. As the pistons 58 rotate the spent gases will be brought into communication with the slot 10 and as a circulation of air is taking place constantly through the passage formed by the grooves 6 and 8 these spent gases will be sucked out of the combustion chamber and exhausted into the air through the port 29.

It is to be understood that the stator 1 can be mounted in any suitable supporting structure a portion of which has been indicated generally at 72 in Figures 4 and 5.

What is claimed is:

1. A rotary internal combustion engine including a stator, a compression chamber and a combustion chamber in the stator, eccentrically mounted rotors within the respective chambers and contacting with the walls thereof to form crescent shaped spaces, radial movable pistons carried by each rotor and slidably engaging the walls of the chambers, a port connecting the chambers adjacent the points of contact between the rotors and the walls of the chambers, a fuel intake port opening into the compression chamber and having oppositely extending grooves in the wall of the chamber and extending partly around the rotor, an outlet port in the wall of the explosion chamber, an air passage within the wall of the explosion chamber and communicating with the outlet port and with the external atmosphere, and means operated by the engine for directing an air current into said passage and toward the outlet port.

2. A rotary internal combustion engine including a stator having a compression chamber and an explosion chamber, an intake port opening into the compression chamber, an exhaust port extending from the explosion chamber, a port connecting said chambers, an eccentrically mounted rotor in each chamber and contacting with the wall thereof adjacent the connecting port, radially movable pistons carried by each rotor and slidably engaging the wall of the chamber, a fan operated by the rotors, and means for directing an air current from the fan and into the wall of the explosion chamber to the outlet port.

3. A rotary internal combustion engine including a stator, a ring inserted therein and having an eccentric opening constituting a combustion chamber, there being registering grooves within the meeting faces of the stator and ring forming an annular air passage, said passage having an inlet and an outlet in opposed portions of the stator, a rotor eccentrically mounted within the explosion chamber and contacting with the wall thereof at one point, radially movable pistons carried by the rotor and slidably engaging the wall of the explosion chamber, and means operated by the rotor for directing an air current into the air passage to the outlet thereof, and an exhaust port extending from the explosion chamber to said outlet.

4. A rotary internal combustion engine including a stator, a chamber therein, a rotor eccentrically mounted in the chamber and contacting with the wall thereof at one point, radially movable crossed pistons carried by the rotor and slidably engaging the wall of the chamber, each piston having beveled outer ends, heads slidably mounted on said beveled outer ends, means extending radially through the heads for holding the heads to the pistons, and tapered packing blocks carried by the rotor and frictionally engaged by opposed sides of the pistons for sealing the space between the pistons and the rotor.

5. In a rotary internal combustion engine a stator having a chamber therein, a rotor eccentrically mounted within the chamber and contacting with the walls thereof at one point, pistons slidably mounted within the rotors and having beveled outer ends, heads mounted on said ends and slidable thereupon the angle of the ends being such that pressure exerted against the heads will shift the heads and press them against the wall of the stator during the actuation of the rotor, and tapered sealing blocks carried by the rotor and frictionally engaged by opposed faces of the pistons.

In testimony that I claim the foregoing as my own, I have hereto affixed my signature in the presence of two witnesses.

WILLIAM YEATTS.

Witnesses:
B. M. REID,
F. L. MOSES.